Figure 5:
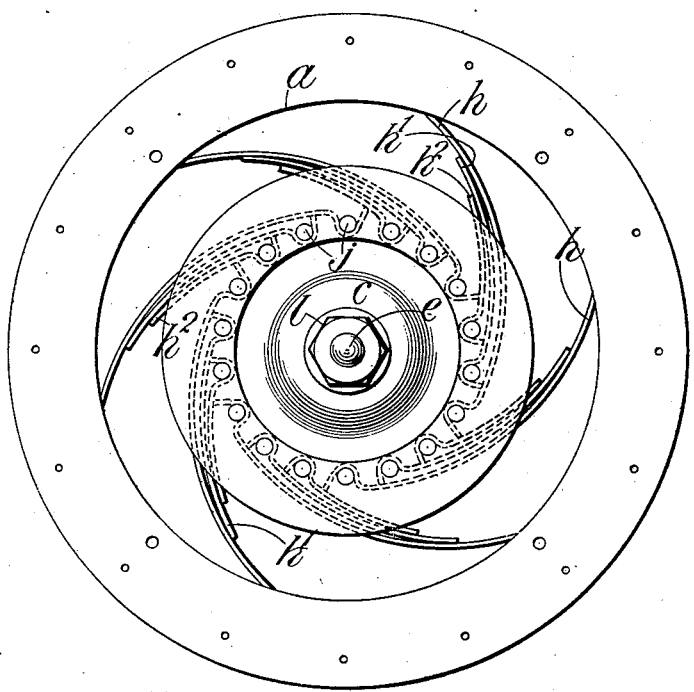

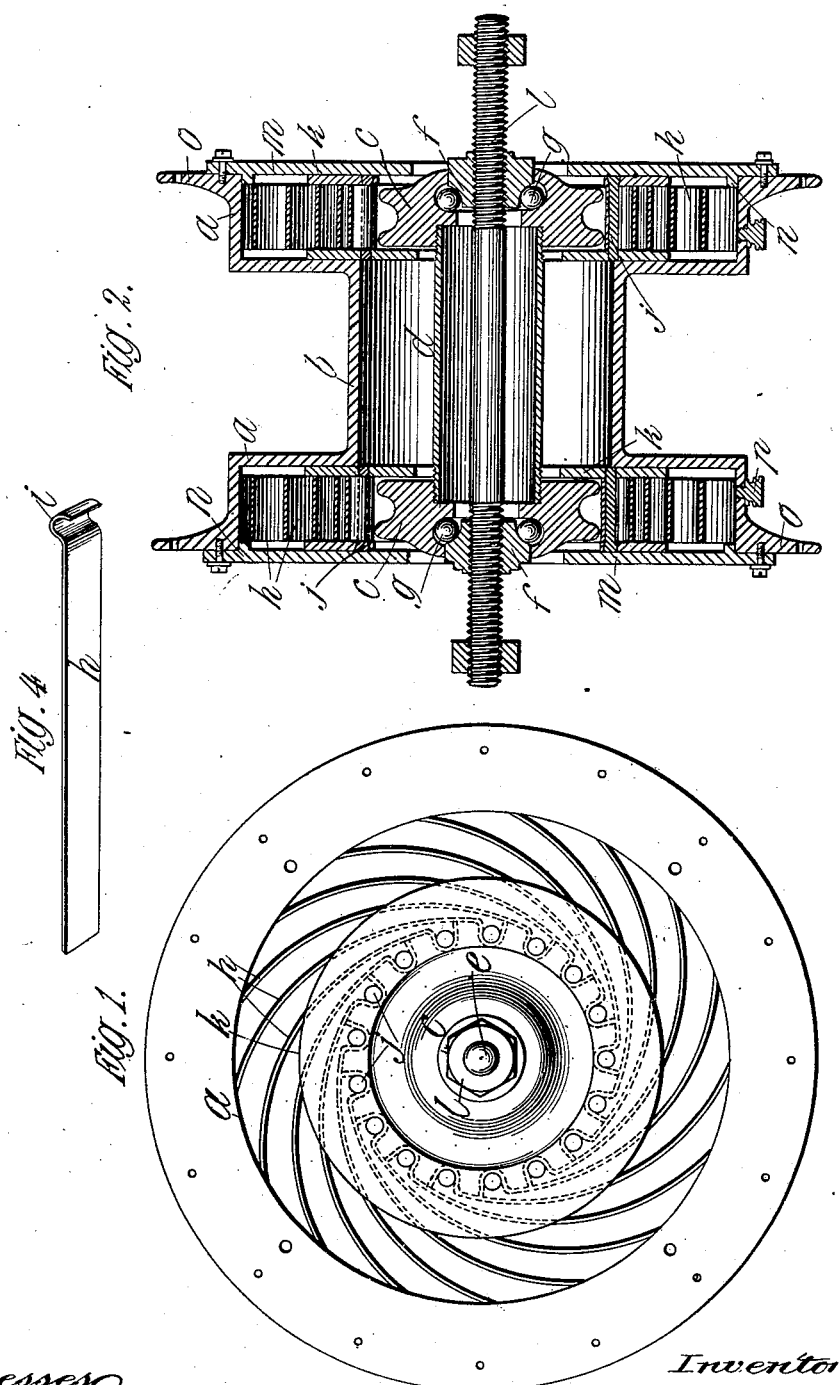

No. 714,221. Patented Nov. 25, 1902.
W. C. MORTON.
WHEEL.
Application filed Aug. 7, 1901.
(No Model.) 3 Sheets—Sheet 2.
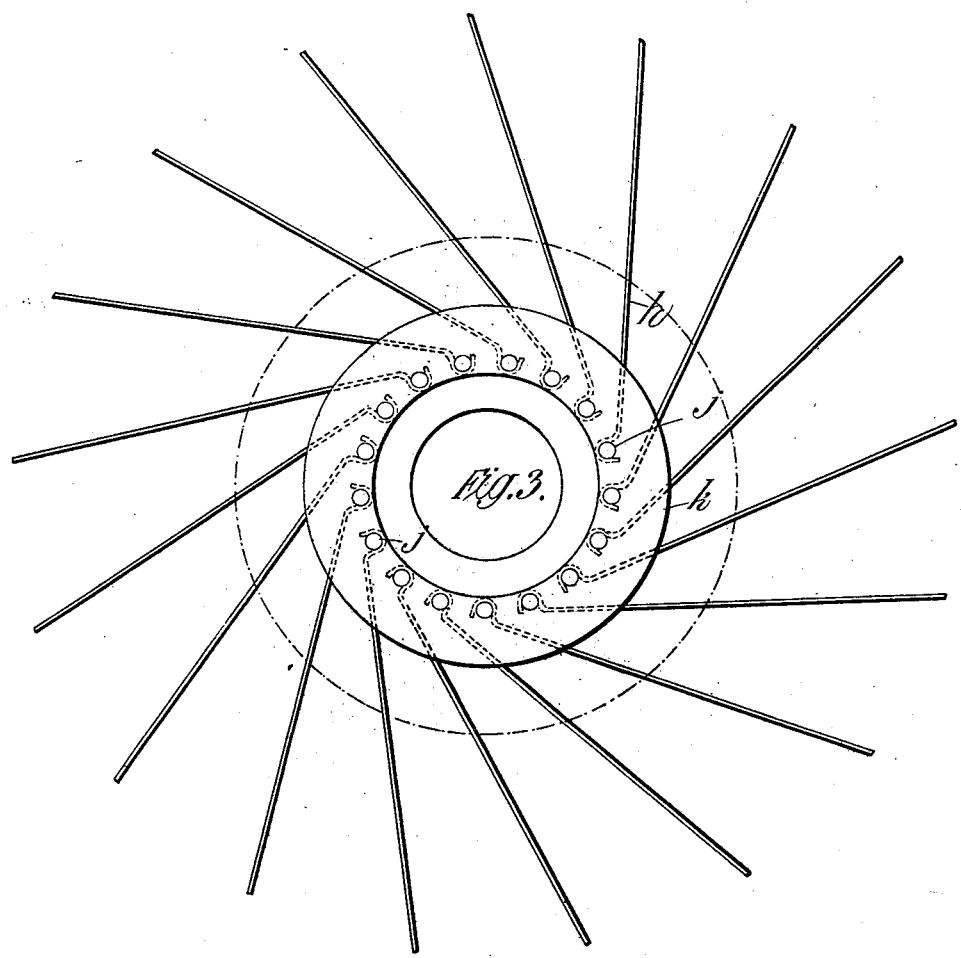

No. 714,221. Patented Nov. 25, 1902.
W. C. MORTON.
WHEEL.
Application filed Aug. 7, 1901.

(No Model.) 3 Sheets—Sheet 3.

Witnesses. Inventor,
Chas. K. Bennett. William C. Morton,
Jno. T. Cross. by Horace Pettit
his Attorney.

THE NORRIS PETERS CO., PHOTO-LITHO., WASHINGTON, D. C.

UNITED STATES PATENT OFFICE.

WILLIAM CHARLES MORTON, OF BARNES, ENGLAND.

WHEEL.

SPECIFICATION forming part of Letters Patent No. 714,221, dated November 25, 1902.

Application filed August 7, 1901. Serial No. 71,196. (No model.)

*To all whom it may concern:*

Be it known that I, WILLIAM CHARLES MORTON, civil servant, a subject of the King of Great Britain, residing at 26 Lonsdale road, Barnes, in the county of Surrey, England, have invented certain new and useful Improvements Relating to Wheels, of which the following is a specification.

My invention has reference to wheels having elastic or resilient hubs, and more particularly to those adapted to be used for motor-driven road-vehicles.

Hubs of the kind to which my invention has reference have comprised as heretofore constructed concentric members or portions with radially-disposed helical springs arranged between them, the outer member or portion being connected to the inner end of the spokes and the inner member or portion constituting the bearing for the axle. This arrangement, however, has the drawback that for any given position of the wheel only a comparatively small proportion of the aforesaid springs exert effective resilient resistance to the weight of the vehicle, the remainder being inoperative, since the said weight is sustained almost exclusively by the spring or springs which are for the time being approximately vertically below the axle. Moreover, only the spring whose line of effective force or resistance is in a vertical line with the center of the axle is in a position to exert its full effective resilient resistance, and as it is impossible to indefinitely increase the number of the said springs it inevitably follows that several times during each revolution of the wheel the aforesaid vertical line does not pass through any of the said springs. The above objections are necessarily present in every arrangement in which the springs are so disposed that they are adapted to exert their force or resistance in a direction radial to the wheel. Hence it follows that in such arrangements the springs are not used to the best advantage, and are therefore weak, variable, and inefficient in their action.

It is the object of the present invention to overcome these objections, and for this purpose I employ springs of such a kind and arranged in such a manner that for every possible position of the wheel during the revolution and travel of the latter a vertical line drawn as aforesaid from the center of the axle would cut not one only, but a considerable number of the said springs on a line, making comparatively small angles with the lines of effective force or resistance of the said springs. Moreover, in my improved arrangement the weight of the vehicle does not bear exclusively upon the springs through which the aforesaid vertical line would pass, but is distributed among a large proportion of the entire number of springs carried by the hub.

According to my said invention I so arrange the aforesaid springs that their lines of effective force or resilient resistance to the weight are not radial to the wheel, while at the same time they do not make a large angle with the radii, and each spring is inclined in such manner as to lean over one or more of the springs adjacent to it, all of the springs leaning in the same direction and to an approximately equal extent. The springs which I prefer to employ preferably consist of flat strips or blades of elastic metal, preferably steel, of a length greater than the radial distance between the inner and outer members or portions of the hub, and the said metal strips or blades are bent in the manner hereinafter described and inserted into the hub. Around the aforesaid inner member or portion and concentric therewith I firmly secure a series of transverse pins or studs, to which are attached the inner ends of the aforesaid metal strips or blades, which latter I bend, as aforesaid, on a curve of wide radius. I then insert the said inner member and the metal strips or blades carried thereby into the outer member of the hub in such manner that the said strips or blades in tending by the force of their elasticity to straighten themselves are prevented from doing so by the rigid circumference of the outer member.

In order that my invention may be clearly understood and readily carried into effect, I will proceed to describe the same more fully with reference to the accompanying drawings, in which—

Figure 1 is an end elevation, and Fig. 2 a transverse section, of a wheel-hub constructed according to my invention, the end plate or cover thereof having been removed in Fig. 1 in order to show the disposition of the springs.

Figure 6:

Fig. 3 is an elevation of the inner member of the hub and the springs in the position they occupy prior to their insertion into the outer member of the hub, and Fig. 4 is a separate view of one of the flat springs. Fig. 5 is an end elevation illustrating a slightly-modified arrangement of the springs. Fig. 6 is a detail view of one of the springs detached from the hub.

*a a* are the outer members or portions of the hub, which, as shown in Fig. 2, are in the form of shallow circular boxes and are connected together at a suitable distance apart by means of a tubular connecting-piece *b*, so as virtually to form a single member.

*c c* are the inner members or portions, which also constitute virtually a single member and may be screw-threaded in their interior to engage with the opposite ends of a correspondingly screw-threaded tubular connection *d*.

*e* is the axle of the wheel. *f f* are bosses or enlargements upon the said axle provided with ball-races, and *g g* are antifriction-balls interposed between the said boss or enlargement and the aforesaid inner ring, or where my improved hub is used in connection with the driving wheel or wheels of the vehicle the aforesaid inner member may be keyed directly onto the driving-axle.

*h h* are the aforesaid springs, which may either be of uniform thickness throughout their length or may, as shown in Fig. 6, taper toward their outer ends, their inner ends being, as shown at *i* in Fig. 4, shaped in the form of hooks, adapted to engage with and grip the aforesaid pins or studs *j j*, by which latter the said springs are connected to the hub. The ends of the said pins or studs pass through and are secured in wide annular plates or flanges *k k*, which may either be integral with the aforesaid inner ring or may be separate therefrom, and which may in the case of a motor-vehicle be keyed upon the driving-axle.

The aforesaid springs may either be all of the same length or a number of them may, as shown in Fig. 5, be made shorter in length than the remainder. In the latter case the springs of different lengths are serially arranged, the disposition of the said springs being such that the lighter shocks or vibration to the wheel caused by roughness upon the road are absorbed by the longer springs *h*, the heavier shocks being absorbed by the shorter springs $h'$ and $h^2$. In this manner the spring-hub is enabled to exert a graduated resilient resistance to shocks and vibration.

A convenient method which I sometimes employ for introducing the springs *h* into the hub is the following: After having inserted and secured the pins or studs *j j* into the holes provided for their reception in the annular plates or flanges *k k* I arrange the flat metal strips or blades in position by engaging the aforesaid hook-shaped ends *i i* with the aforesaid pins or studs *j j* between the flanges *k k*, as shown in Fig. 3. I then place the annular plates or flanges *k k*, carrying the flat metal strips or blades, on a suitable table and surround the said metal strips or blades by a strong flexible metal or other band. One end of the said band is fixed to the table, the other or free end being passed over a pulley pivoted at a point close to the point of attachment of the fixed end and being connected to a suitable source of power whereby the said band is pulled or wound onto a reel or drum. The effect of such pulling or winding is to reduce the diameter of the circle described by the said band, and thereby to bend all the aforesaid metal strips or blades and at the same time cause them to lean toward the direction in which the band is being strained by the aforesaid power. To facilitate the bending of the said strips or blades, they may be made slightly curved in the direction in which they are required to be bent, so as to give them a bias in the said direction. When the said bending has proceeded to an extent at which the diameter of the circular band is somewhat less than that of the outer member *a* of the hub, the aforesaid outer member is placed immediately over the said bent metal strips or blades, together with the aforesaid flanges, and pushed down over the latter, the said band being slipped off as the whole inner member, metal strips, and flanges are introduced into position within the said outer member. The bent metal strips or blades then assume the form shown in Fig. 1 and constitute the springs by means of which the desired resiliency of the hub is obtained.

When both the series of springs, inner rings, and flanges are in place at opposite ends of the hub, the axle and antifriction-balls are inserted into their proper positions, where they are secured by means of nuts or other suitable retaining devices *l*, after which the aforesaid end plates or covers *m* are placed over the open ends of the boxes *a a* and removably fastened thereupon by any convenient means. The said end plates are also provided with circular flanges *n*, which fit against the inner circumference of the outer member and serve to exclude rain, dust, and dirt from the interior of the hub. In the case of wheels having wire spokes the said spokes may have their inner ends attached to flanges *o* upon the periphery of the outer member. I do not, however, limit myself to hubs to be used with wire spokes, as wooden or other spokes may, if desired, be employed.

The outer member of the hub may be provided with an orifice for enabling oil or other lubricant to be introduced for the purpose of keeping the springs in good condition, the said orifice being adapted to be closed by a screw-threaded or other plug or cap *p*.

What I claim, and desire to secure by Letters Patent of the United States, is—

1. A spring wheel-hub comprising in combination an inner member, an annular frame surrounding said inner member, a series of blade-springs carried by said frame, and a spoke-carrying outer member resting upon said springs, the said inner and outer members being capable of movement relatively to each other, substantially as described.

2. In a spring wheel-hub the combination with an axle-carrying inner member and a spoke-carrying outer member in the form of a circular box, said members being capable of movement relatively to each other, of a series of blade-springs interposed between said members and provided with hooked inner ends, a pair of annular plates surrounding the inner member and transverse pins connecting said annular plates together and adapted to engage with the hooked ends of the springs, substantially as described.

3. In a spring wheel-hub, a plurality of inner members, a plurality of outer members adapted to carry the spokes and incapable of movement relatively to each other, but movable relatively to the inner members, a series of blade-springs interposed between the inner member and the corresponding outer member, a detachable annular frame surrounding each inner member and means for engaging the inner ends of the aforesaid springs with said frames, substantially as described.

4. In a spring wheel-hub the combination with an inner member and an outer concentric member in the form of a circular box the said members being capable of movement relatively to each other, of a series of blade-springs interposed between said members, of a pair of annular plates surrounding the inner member, of transverse pins connecting said annular plates together, of hooked inner ends to said springs for engaging with said pins and of a detachable plate for closing the open end of said circular box, substantially as and for the purpose specified.

5. In a spring wheel-hub the combination with an inner member adapted to carry the wheel-axle and an outer concentric member in the form of a circular box, adapted to be connected with the wheel-spokes the said members being capable of movement relatively to each other, of a series of blade-springs alternately long and short, interposed between said members, of a pair of annular plates surrounding the inner member, of transverse pins connecting said annular plates together, of hooked inner ends to said springs for engaging with said pins and of a detachable flanged plate for closing the open end of said circular box, substantially as and for the purpose specified.

6. In a spring wheel-hub, the combination with a plurality of inner members adapted to carry the wheel-axle and a plurality of outer concentric members adapted to carry the spokes and incapable of movement relatively to each other but movable relatively to the inner members, of a series of blade-springs alternately long and short interposed between the inner members and the corresponding outer members, a pair of annular plates surrounding each inner member, transverse pins connecting the plates of each pair together, and hooked inner ends to the aforesaid springs for engaging with said pins, substantially as described.

7. In a spring wheel-hub the combination with an inner member adapted to carry the wheel-axle and an outer member in the form of a circular box adapted to be connected with the wheel-spokes, the said members being capable of movement relatively to each other, of a series of blade-springs diminishing in thickness toward their outer ends interposed between said members, of a pair of annular plates surrounding the inner member, of transverse pins connecting said annular plates together, of hooked inner ends to said springs for engaging with said pins and of a detachable flanged plate for closing the open end of said circular box, substantially as and for the purpose specified.

8. In a spring wheel-hub, the combination with a plurality of axle-carrying inner members and a plurality of spoke-carrying outer members incapable of movement relatively to each other but movable relatively to the inner members, of a series of blade-springs diminishing in thickness toward their outer ends interposed between the inner members and the corresponding outer members, a pair of annular plates surrounding each inner member, transverse pins connecting said plates and hooked inner ends to said springs for engaging with said pins, substantially as described.

In testimony whereof I have hereunto set my hand, in presence of two subscribing witnesses, this 19th day of July, 1901.

WILLIAM CHARLES MORTON.

Witnesses:
THOMAS PELLY WARDLE,
WALTER J. SKERTEN.